United States Patent
Miller et al.

(10) Patent No.: US 7,127,233 B2
(45) Date of Patent: Oct. 24, 2006

(54) TECHNIQUE FOR CONTROLLING FRAUDULENT USE OF A TELECOMMUNICATION SERVICE INCLUDING INFORMATION ASSISTANCE

(75) Inventors: John S. Miller, Canby, OR (US); Timothy A. Timmins, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 224 days.

(21) Appl. No.: 10/631,644

(22) Filed: Jul. 31, 2003

(65) Prior Publication Data

US 2005/0026594 A1  Feb. 3, 2005

(51) Int. Cl.
H04M 1/66 (2006.01)
H04M 3/00 (2006.01)
G06F 17/00 (2006.01)
H04K 1/00 (2006.01)

(52) U.S. Cl. .................. 455/410; 379/189; 706/50; 380/250

(58) Field of Classification Search ............... 455/410, 455/411, 415, 435.1; 707/7; 379/145, 114.14, 379/114.15, 114.16, 114.02, 127.02; 706/50; 380/250
See application file for complete search history.

(56) References Cited

U.S. PATENT DOCUMENTS

| | | | |
|---|---|---|---|
| 5,329,578 A | 7/1994 | Brennan et al. | |
| 5,335,278 A * | 8/1994 | Matchett et al. | 380/248 |
| 5,345,595 A * | 9/1994 | Johnson et al. | 455/410 |
| 5,541,977 A * | 7/1996 | Hodges et al. | 455/411 |
| 5,822,691 A * | 10/1998 | Hosseini | 455/410 |
| 5,903,831 A * | 5/1999 | Foti | 455/410 |
| 5,950,121 A * | 9/1999 | Kaminsky et al. | 455/410 |
| 5,953,653 A * | 9/1999 | Josenhans et al. | 455/410 |
| 5,956,634 A * | 9/1999 | Otterson et al. | 455/410 |
| 5,970,404 A * | 10/1999 | Foti | 455/410 |
| 5,978,669 A * | 11/1999 | Sanmugam | 455/410 |
| 5,991,617 A * | 11/1999 | Powell | 455/410 |
| 6,035,043 A * | 3/2000 | Sansone et al. | 380/250 |
| 6,064,972 A * | 5/2000 | Jankowitz et al. | 705/7 |
| 6,249,815 B1 | 6/2001 | Foladare et al. | |
| 6,295,446 B1 * | 9/2001 | Rocha | 455/410 |
| 6,359,880 B1 | 3/2002 | Curry et al. | |
| 6,393,270 B1 * | 5/2002 | Austin et al. | 455/411 |
| 6,442,265 B1 * | 8/2002 | Harlow et al. | 379/189 |
| 6,519,331 B1 * | 2/2003 | Stevens et al. | 379/145 |
| 6,856,982 B1 * | 2/2005 | Stevens et al. | 706/50 |
| 2001/0053685 A1 * | 12/2001 | Mori et al. | 455/411 |
| 2004/0203750 A1 | 10/2004 | Cowdrey et al. | |

* cited by examiner

Primary Examiner—William Trost
Assistant Examiner—Kiet Doan
(74) Attorney, Agent, or Firm—Kaye Scholer LLP

(57) ABSTRACT

The phone number used by a caller accessing a telecommunication service is derived. For example, this phone number may be used to look up in a first database the name of the user registered with the service, and in a second database the name of the subscriber assigned the phone number. If the two names correspond, the caller is provided with the telecommunication service. Otherwise, a fraud has been detected and various consequences may be visited upon the caller or the user. Some of these consequences include denying use of the service, charging the caller extra for use of the service, etc.

46 Claims, 2 Drawing Sheets

TECHNIQUE FOR CONTROLLING FRAUDULENT USE OF A TELECOMMUNICATION SERVICE INCLUDING INFORMATION ASSISTANCE

BACKGROUND OF THE INVENTION

The invention relates generally to a communications system and method. More specifically, the invention relates to a system and method for detecting and rectifying fraudulent use of a telecommunication service.

In prior art, a subscriber to a telecommunication service may be able to access information assistance through the telecommunication service. However, the information assistance service traditionally is considered to be ancillary to the telecommunication service, and they are born out of two distinct service concepts (i.e., selling information vs. selling use of a network facility). In fact, a telecommunication service typically is provided by a carrier (e.g., AT&T Wireless Services Inc.) or branding partner (e.g., Virgin). On the other hand, the information assistance service accessible through the telecommunication service may be contracted by the carrier, especially a wireless telephone carrier, and is run by an independent contractor. That is, carriers may contract different independent providers to provide information assistance services for them. When a subscriber to the telecommunication service want to access information assistance, he/she may dial such typical access digits as "411," "*555," "555-1212,""00," etc. Because of the contractual relationship, the carrier would switch such an information assistance call to its contracted information assistance service provider to handle the call.

In accord with the prior art telecommunication service model, information assistance service charges are levied on a user, in addition to any telecommunication charges for use of the carrier's network facility to route the user's call to a destination party. That is, when a user is connected to a destination party through an information assistance service provider, the user not only is charged for searching for the destination party's telephone number and other information assistance, and also for using the carrier's network facility to complete the connection to the destination party. The telecommunication charges and information assistance service charges typically are priced on different bases, especially when the assistance service provider is independent from the carrier, although the two charges may be consolidated in the same carrier's bill to the user. Typically, the assistance service charges are billed on a per call basis whereas the telecommunication charges are billed based on the connection time.

Subscribers to a telecommunication service may sign up as business, residential, wireless, governmental customers, etc. The telecommunication service may provide differing pricing structures and different classes of service for each customer class. For example, a carrier may offer a lower telecommunication service rate to a business customer than a residential customer, in anticipation of a relatively large call volume, and thus large telecommunication charges, from the business customer.

SUMMARY OF THE INVENTION

Up to now, there has been no systematic way of verifying that the customers using the different classes of telecommunication service are either eligible or authorized to use that class of service.

The invention is particularly applicable to a telecommunications service, including information assistance as part of the service, where each call made via the telecommunication service is first routed to an information assistance provider, e.g., an operator. The phone number from which the call originates is derived, e.g., from an ANI associated with the call to facilitate provision of information assistance. The invention takes advantage of the knowledge of the originating phone number to detect fraudulent use of the telecommunication service.

In accordance with the invention, a class of service is defined, which may be accorded a discount on the telecommunication service rate. A party registered with the service is afforded the class of service based on at least one attribute of the party, e.g., a business user versus a residential user. When a call is received from a caller, which includes an information assistance request, the telephone number from which the call originates is derived. The attribute of the party which is associated with the telephone number is obtained. Based on the same telephone number, data concerning a party to which the telephone number is assigned is also obtained. Fraudulent use of the class of service is determined when the data does not correspond to the attribute.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

Figure 1:
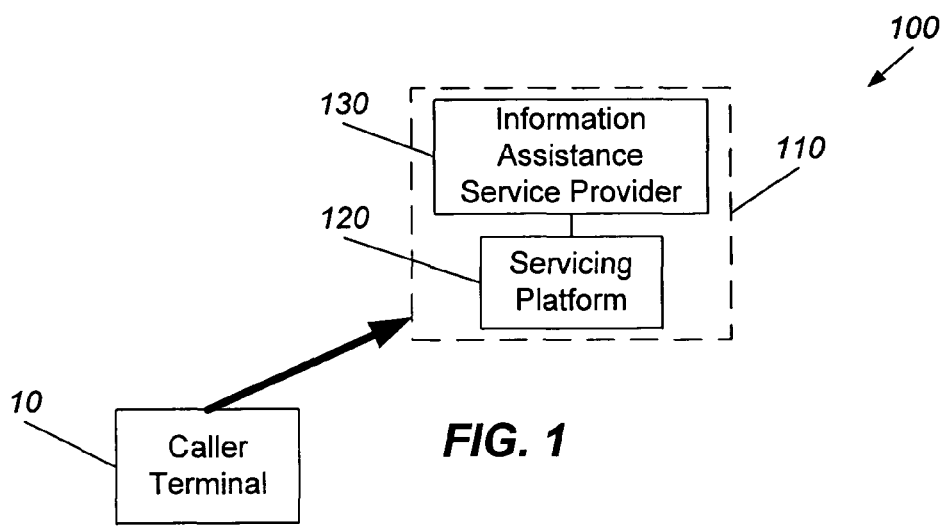
FIG. 1 illustrates a system for connecting a caller terminal to a destination terminal via an enhanced telecommunication service in accordance with an embodiment of the present invention.

The present invention is directed to controlling fraudulent use of a telecommunication service, e.g., an enhanced telecommunication (telecom) service which incorporates information assistance service features therein. In prior art, information assistance including, e.g., searching for a desired destination party's telephone number, is considered an ancillary service to a telecommunication service. Information assistance service charges typically are tagged onto telecommunication charges for utilizing a carrier's network facility to complete the user's call to the destination party. The information assistance service and the telecommunication service typically are priced on different bases. For example, the information assistance service charges typically are determined on a per call basis whereas the telecommunication charges are determined based on the connection time, although the two different charges for an information assistance call may be consolidated in the same bill to the user.

The enhanced telecom service concept stems from a recognition of the efficacy of various information assistance service features which have been developed over time, and which include, e.g., personalized service features, information management service features, and concierge-type service features described below. The enhanced telecom service is born out of an anticipation that a user or a destination party may take advantage of the various information assistance service features during a call, even though the user when initially making the call may have no intent to use any of the service features. In a preferred embodiment, the provider of the enhanced telecom service has both information assistance capability and network capacity for connecting a user to a destination party. For example, an enhanced telecom service provider may be an improved information assistance service provider having network capacity (e.g., PSTN, wireless, and/or private network capacity) at its disposal, e.g., by leasing capacity and equipment from a carrier. Thus, the enhanced telecom service provider has end-to-end connectivity, readily providing information assistance to a user at his/her initiative during a call. With connectivity costs within its control, the enhanced telecom service provider may charge for the enhanced telecom service according to a single fee schedule, notwithstanding the fact that the user may have utilized both information assistance and telecom services during the same call, for which in prior art are charged according to the respective fee schedules. For example, the provider may charge the enhanced telecom service strictly on a connection time basis, e.g., 9 cents per minute of the call, regardless of the number of invocations of information assistance and connections to different destination parties during the same call. Another time-based arrangement may be a flat fee for an initial block of minutes (e.g. $1.00 for the first 15 minutes) of call time, after which there would be a fixed charge per minute. A flat fee for each call regardless of the call duration may also be practical under the present enhanced telecom service model. A "cafeteria" style plan which may involve separate charges for each service provided may be practical as well.

Advantageously, the enhanced telecom service model is conducive to saving such administrative costs as would otherwise be incurred in prior art where the information assistance and telecommunication service charges are determined separately. Especially where the information assistance service provider and the carrier are independent in prior art, the administrative needs of collecting off-line information concerning assistance service charges due the service provider, associating such charges with the corresponding telecommunication charges due the carrier, and combining both charges for billing a user is advantageously obviated by implementing the present enhanced telecom service model.

The enhanced telecom service may be accessed via a designated telephone number, e.g., 1010-XXX-XXXX, 800-XXX-XXXX number, etc. Such a designated number may be publicized in many ways. For instance, the number may be imprinted on a credit card (especially when services are charged to the credit card), prepaid calling card, telephone charge card, etc. Billing for the enhanced telecom service may be by credit card, prepaid calling card, debit card, direct billing to subscribers, or billing through a third party which may already have a billing relationship with the subscribers for other services, e.g., utilities.

For example, when a user accesses the enhanced telecom service via the designated telephone number, the user's call may be routed to an information/call center before it is connected to a destination party desired by the user. The user's call typically is accompanied with call signaling including an automatic number identification (ANI), which represents the user's phone number from which the call originates. The user may be identified at the information call center by the ANI, or alternatively by, or in combination with, a user identification (ID), password, PIN, mother's maiden name, user voice recognition, user voiceprint, etc. The user may be afforded service features specified in a user profile identified, e.g., by the ANI and user voiceprint. The user profile may contain personal preferences which may be selected by the user during an initial registration with the enhanced telecom service, and which may be modified subsequently. An implementation of the user profile to render a personalized information assistance service is described, for example, in copending, commonly assigned U.S. application Ser. No. 10/323,287 filed on Dec. 19, 2002, which is incorporated herein by reference.

For example, the user may be an employee of a company, which subscribes to the enhanced telecom service. The user profile may specify the enhanced telecom service features selected by the company, and identify access to the company's corporate directory and other company-specific services. In addition, if the user utilizes the company's facility to make an outside call, the user may be prompted for an entry of a charge number authorized by the company to fully take advantage of the enhanced telecom service.

The enhanced telecom service features may include concierge-type services, which may encompass a restaurant guide and reservation service, event ticketing and reservation service, hotel reservation and availability service, travel or flight reservation and ticketing service, ordering specific items such as flowers or food delivery, arranging transportation, and accessing entertainment guides. Details of such concierge-type services are described, e.g., in commonly-assigned, co-pending U.S. application Ser. No. 09/520,306, filed Mar. 7, 2000, incorporated herein by reference.

Other enhanced telecom service features may include information management services, which may encompass maintaining for the user appointment schedules, lists of contacts (also known as private directories), to-do lists, notes, etc. The user may access the service to connect to a contact, retrieve an appointment or to-do list item, set up a new appointment or to-do list item. Details of such information management services are described, e.g., in, U.S. Pub. No. 2002/0055351 A1, published May 9, 2002, incorporated herein by reference.

Another service feature that may be made available to an enhanced telecom service user includes StarBack®. As described, e.g., in U.S. Pat. No. 5,797,092, StarBack® allows a user, after being connected to a desired destination party, to be connected back to the information/call center for further assistance by pressing a designated key (such as the "star" (*) key) on the user's telephone. If the user desires to make another call after finishing a conversation with a first destination party, the user invokes StarBack® and is redirected to the information/call center to be connected to a second destination party.

In an illustrative embodiment of the invention, the enhanced telecom service has different classes of customers, e.g., business, residential, wireless, and governmental. Each class of customers may be offered a different class of service or different features. Some of the features offered, in addition to directory assistance services, may include concierge-type services and information management services.

The enhanced telecom service may market one or more of these services in different packages to different customers or classes of customers. For example, concierge-type and information management services may be marketed to business customers, concierge-type services and StarBack® may be marketed to residential customers, and concierge-type and information management services and StarBack® may be marketed to wireless customers. In addition, the pricing for these services or packages of services may vary based on number of services available and class of customer. For example, if the enhanced telecom service wants to encourage businesses to sign on for a service package, it may provide the service package at a discount because of their potentially high call volumes, whereas residential customers may have to pay more for the same service package.

An aspect of the invention is directed to providing a discounted enhanced telecom service to a class of authorized customers and then detecting whether the customers are abiding by such authorization. For example, a business, say, XYZ Company, may be offered an enhanced telecom service package including the concierge-type, information management, and StarBack® service features for its employees to use while at work. XYZ Company registers with the enhanced telecom service several telephone numbers from which its employees may access the enhanced telecom service. However, it is possible that not all of the telephone numbers actually belong to XYZ Company, but rather are employees' home telephone numbers or wireless telephone numbers, and calls from these numbers are therefore unauthorized to take advantage of the discounted service offered. While employees may subscribe to the enhanced telecom service on their own, because they may pay a higher rate to use the service, they may be tempted to piggy-back on the business's plan. The invention uses a network of databases to detect such unauthorized piggy-backing and control fraudulent use of the enhanced telecom service.

FIG. 1 illustrates arrangement 100 in which an XYZ Company employee (a "caller") in such a scenario initiates a call from caller terminal 10 by dialing such a designated number as 1-800-XXX-XXXX, 10-10-XXX-XXXX, etc. In accordance with the enhanced telecom service in this instance, each call is initially routed to information/call center 110 based on the designated number before the call is connected to a destination party desired by the caller. Caller terminal 10 may comprise a wireless telephone, wireline telephone, personal digital assistant (PDA), computer, or other communication device. In this illustrative call, the caller identifies to information assistance service provider 130 including, e.g., an operator, the name and address (sometimes city or area code) of a desired destination party. In response, the operator locates the desired destination telephone number using, e.g., a computer database, and connects the caller to the destination number. Anytime during or after the connection with the destination party, as long as the caller does not hang up, the caller may exercise the StarBack® feature to be reconnected to an operator. The caller may then request the operator to perform the aforementioned concierge-type service, information management service, etc., or to be connected to a second destination party. It should be noted that such concierge-type service, information management service, etc. may be requested of the operator anytime including when the call is initially received by the operator. It should also be noted that the term "operator" used herein broadly encompasses entities that are capable of providing information assistance in a telecommunication environment, including without limitation human operators, voice response/recognition capabilities, web-/WAP-enabled operator services, and other automated and electronic access.

Figure 2:
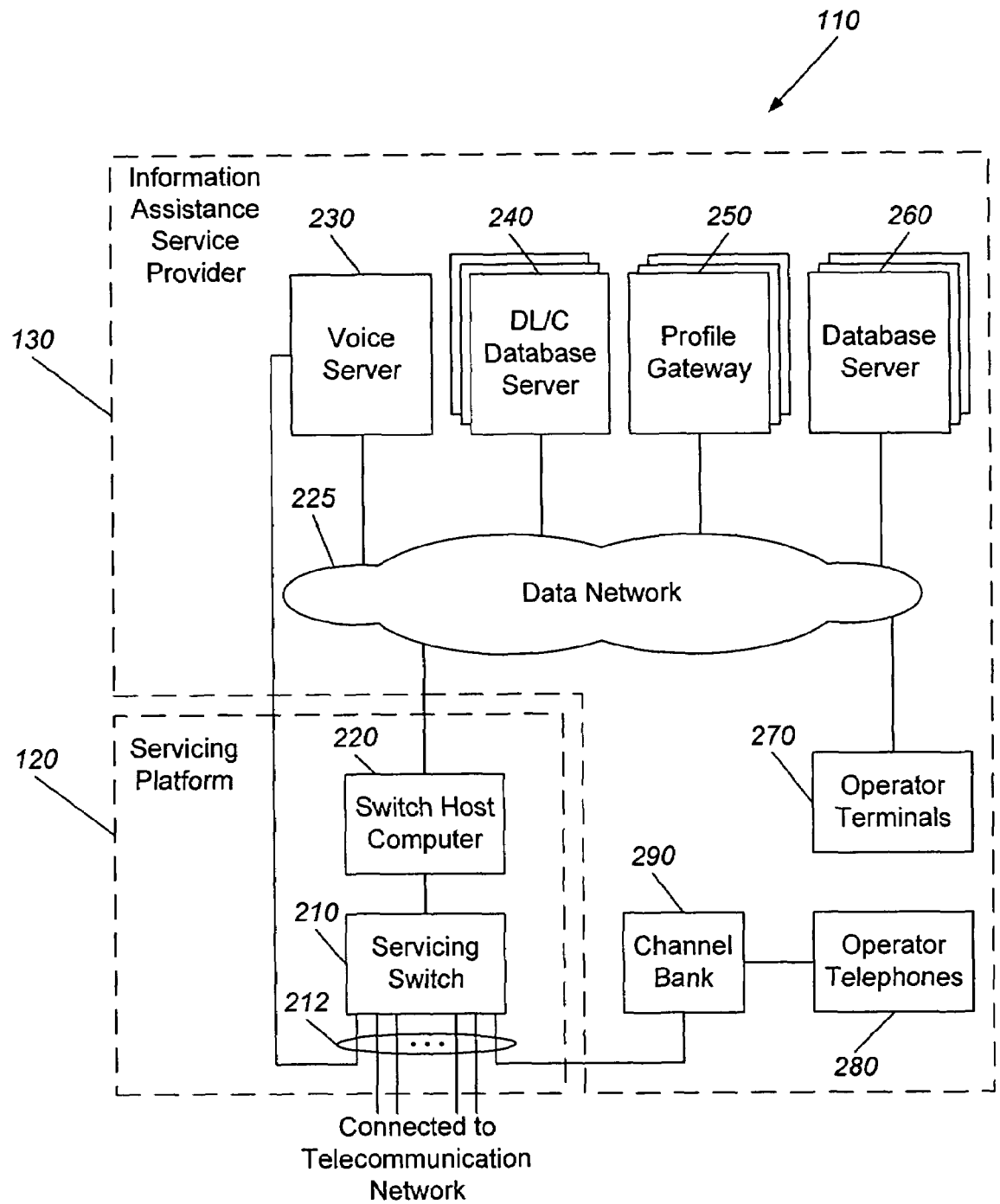
FIG. 2 illustrates an information/call center for providing the enhanced telecommunication service.

FIG. 2 illustrates information/call center 110, which may be configured to include information assistance service provider 130 together with servicing platform 120. It should be noted that even though both service provider 130 and servicing platform 120 appear in the same figure, they may or may not be located in the same geographic area. Servicing platform 120 includes servicing switch 210 having T1 spans 212 for connection to voice server 230, channel bank 290. Other T1 spans 212 connect service platform 120 to a telecommunication network, e.g., PSTN, wireless telephone network, private network, or a combination thereof. In this instance, such a telecommunication network, together with information/call center 110, is administered by the enhanced telecom service provider.

In an alternative embodiment, voice information may be packetized and transmitted pursuant to a voice over Internet protocol (VOIP) through a packet-switched network, e.g., the Internet, to information/call center 110. Servicing switch 210 may receive an incoming call from the telecommunication network. Servicing switch 210 may also be used to place an outgoing call onto the telecommunication network.

Channel bank 290 in service provider 130 is used to couple multiple operator telephones 280 to servicing switch 210. The operators in information/call center 110 are further equipped with operator terminals 270, each of which includes a video display unit and a keyboard with an associated dialing pad. Operator terminals 270 are connected over data network 225 to one or more database servers 260, switch host computer 220, voice server 230, etc. By way of example, data network 225 includes a local area network (LAN) supplemented by a number of point-to-point data links.

Servicing switch 210 is conventional and supports digital T1 connectivity. The operation of servicing switch 210 is governed by instructions stored in switch host computer 220. In this illustrative embodiment, servicing switch 210 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 110 and servicing switch 210 for each corresponding function.

An incoming call is received by servicing switch 210 in information/call center 110, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 220 or elsewhere in information/call center 110. In other instances, other distribution logic may be utilized, such as skills-based routing or a priority scheme for preferred users. In a preferred embodiment, when the information assistance call is received by servicing switch 210 in information/call center 110, switch 210 in a well known manner, derives the aforementioned ANI from the signaling associated with the call. As mentioned before, the ANI represents the caller's phone number from which the call originates.

Operators may use database server 260 to search for a caller's desired party and determine the appropriate destination number of the party. Other information assistance concerning restaurant recommendations, movie listings, events, etc. may also be provided by searching one or more of the internal and external databases, and the Internet. In this illustrative embodiment, database server 260 may access "line information databases (LIDBs)" (also known as "line identification databases"), or other well known databases to keep track of telephone numbers assigned to users of the service. For example, a LIDB is a database maintained by a local telephone company that contains, for each telephone number assigned to a subscriber, subscriber information such as name, address, and subscriber type and possibly credit card or calling card verification information. The present enhanced telecom service provider contracts with the telephone companies that maintain these LIDBs to access the databases to verify the identities of callers based on the telephone number used, in accordance with the invention.

Voice server 230 (also known as a "voice response unit" or "VRU") is used to play the constant repeated parts of an operator's speech, namely, the various greetings and signoffs (or closings). Voice server 230 is connected via data network 225 to switch host computer 220 and via one or more T1 spans 212 to servicing switch 210. Voice server 230 may comprise a general-purpose computer and one or more voice cards for voice recognition, voice recording and playback, and call progress analysis. At appropriate stages in a call progression, switch host computer 220 initiates a voice path connection between voice server 230 and servicing switch 210 such that the user, or the user and the operator, are able to hear whatever pre-recorded speech is played on that connection by voice server 230. Computer 220 then instructs voice server 230, via data network 225, what type of message to play, and passes data parameters that enable voice server 230 to locate the message appropriate to the call state.

Data network 225 may further connect to directory listing/concierge (DL/C) database server 240 and a profile gateway 250. DL/C database server 240 may contain directory listing information on restaurants, events, accommodations, transportation, travel information and booking, stock prices, weather, and other services such as grocery or flower delivery, etc. Together, DL/C database server 240 and database server 260 provide operators with the means to search for a caller's desired party and determine the appropriate telephone number. Preferably, these databases can search not only by name and address, but also by type of goods/services and/or geographical region, or by any other attribute in the caller record, including phone number. For example, DL/C database server 240 can answer queries soliciting the names/numbers of restaurants serving a desired cuisine on a given street.

Profile gateway 250 provides access to a user profile, which may include personal information about a subscriber to the enhanced telecom service. Such information may include user preferences (e.g., preferred restaurant and dining time, preferred mode of delivery of reservations), dietary requirements, likes and dislikes, past logged activities, etc. Switch host computer 220 may request via profile gateway 250 the user profile identified by the ANI. If a profile is available, the profile data are served to switch host computer 220 and database servers 240 and 260. For example, when the operator answers the call, server 260 communicates to the operator through terminal 270 any profile data pertinent to the handling of the call.

Figure 3:
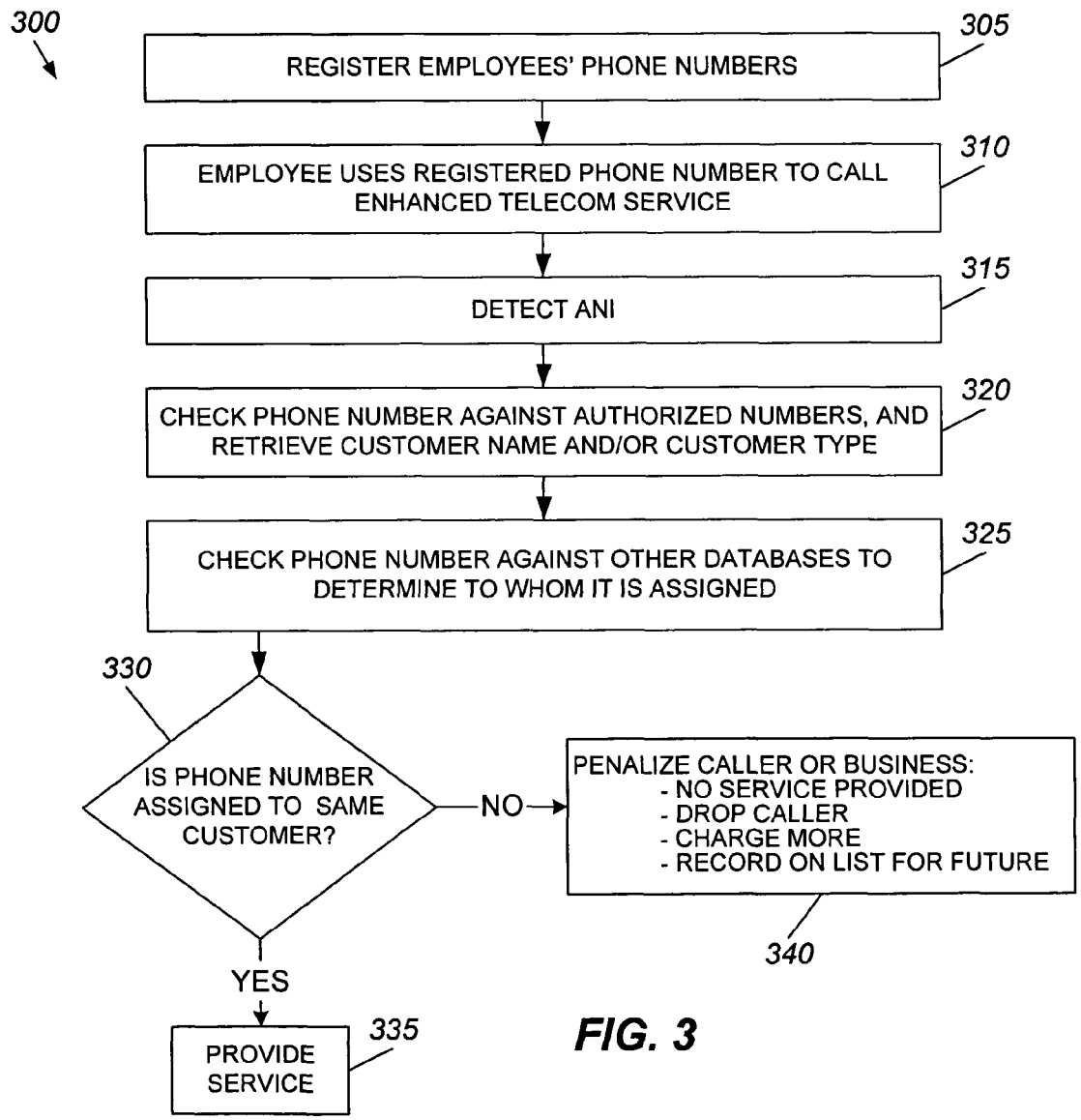
FIG. 3 is a flowchart illustrating a process for controlling fraudulent use of the enhanced telecommunication service.

FIG. 3 illustrates a process for controlling fraudulent use of a telecom service, and in particular the enhanced telecom service, in accordance with the invention. Continuing with the above example, in step 305, the business (e.g., XYZ Company) registers with the enhanced telecom service several telephone numbers from which its employees will call the service at work to take advantage of the service package offered at a discount rate. In step 310, an employee uses a registered phone number to call the enhanced telecom service. As described previously, switch 210 detects in step 315 the ANI from which the call originates.

Once the service has detected the ANI, in step 320, computer 220 checks the ANI against a service database, which includes a list of authorized telephone numbers registered with the service. This service database may be maintained in computer 220 or elsewhere accessible to computer 220. In accordance with the invention, the service database also includes, for each authorized telephone number, the name of the registered customer (e.g., XYZ Company) and/or customer type (e.g., business customer) associated with the authorized number. In this instance, the caller is an employee of a registered customer, and the originating phone number represented by the ANI is on the list of authorized numbers. Computer 220 in step 320 also retrieves from the service database the name of the registered customer, i.e., XYZ Company, and/or customer type information, i.e., business customer, associated with the authorized number represented by the ANI.

In step 325, computer 220 causes database server 260 to check the originating phone number represented by the ANI against other databases, including the aforementioned LIDBs, to determine to whom the telephone number is assigned. As mentioned before, the LIDBs are maintained by local telephone companies which contain, among others, phone numbers assigned thereby to telephone service subscribers, the respective names of the subscribers, and subscriber types.

In step 330, computer 220 compares the name of the telephone service subscriber to which the telephone number is assigned (and/or subscriber type) uncovered in step 325 against the name of the customer (and/or customer type) registered with the enhanced telecom service retrieved in step 320. If these two names (and/or entity types) correspond, i.e., the telephone number is assigned to XYZ Company and/or XYZ Company operates the telephone number for business, as represented by XYZ Company to the enhanced telecom service provider, the enhanced telecom service provider provides service, as shown in step 335. However, if the two names (and/or entity types) do not correspond, for example, the originating number represented by the ANI is assigned to a residential user, then the enhanced telecom service provider has detected XYZ Company and/or the caller trying to defraud the provider (by, e.g., paying a discounted rate to which the caller is not entitled). In such a case, the enhance telecom service may penalize the business, i.e., XYZ Company, and/or the caller, as indicated at step 340. Specifically, the enhanced telecom service provider may deny service or drop the caller or the business; the caller or business may be charged a higher rate, either consistent with a residential rate or maybe even a higher, punitive rate; and/or the phone number may be placed on a "black" list for future reference.

It should be noted that the above fraud detection methodology in accordance with the invention can be carried out synergistically with the enhanced telecom service in that both the service and the methodology involve derivation of an ANI from the call signaling. The derivation of the ANI does not represent any additional process here as the enhanced telecom service needs to derive the same to identify a user profile anyway. For example, as mentioned before, the user profile associated with the ANI may specify, among others, the enhanced telecom service features selected by XYZ Company.

Disclosed herein is a novel concept in detecting fraud in connection with information assistance services. The information assistance service confirms information provided by a caller with information culled from the service's own databases (or databases to which it has access) and may penalize the caller or caller's affiliated business if the information does not match.

Additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

For example, information/call center 110 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for use by a provider of a telecommunication service, including information assistance, to detect fraudulent use of the telecommunication service, the method comprising:
   receiving from a caller a call, which includes at least one information assistance request;
   deriving, from signals associated with the call, a telephone number from which the call originates;
   based on the telephone number, searching a first database for first data concerning a party registered with the service;
   based on the telephone number, searching a second database for second data concerning a party to which the telephone number is assigned;
   comparing the first data with the second data;
   determining fraudulent use of the service if the first data does not correspond to the second data; and
   providing service to the caller at a rate different from the rate given to the party registered with the service, when fraudulent use of the service is determined.

2. The method according to claim 1, wherein the first data includes the name of the party registered with the service, and the second data includes the name of the party to which the telephone number is assigned.

3. The method according to claim 1, wherein the first data includes a type of the party registered with the service, and the second data includes a type of the party to which the telephone number is assigned.

4. The method according to claim 3, wherein the type of the party registered with the service includes a business user.

5. The method according to claim 3, wherein the type of the party registered with the service includes a residential user.

6. The method according to claim 3, wherein the type of the party registered with the service includes a wireless communications user.

7. The method according to claim 3, wherein the type of the party registered with the service includes a governmental user.

8. The method according to claim 1, wherein the information assistance request comprises a request for connecting the caller to a desired destination party.

9. The method according to claim 1, wherein the information assistance request is received after the caller generates a signal to invoke information assistance.

10. The method according to claim 9, wherein the signal is generated by the caller's pressing one or more predetermined keys on a telephonic device.

11. The method according to claim 1, wherein the telephone number is used to identify a profile containing preferences for handling the call.

12. A method for use by a provider of a telecommunication service, including information assistance, the method comprising:
   defining a class of service, a party registered with the service being afforded the class of service based on at least one attribute of the party;
   receiving from a caller a call, which includes at least one information assistance request;
   deriving, from signals associated with the call, a telephone number from which the call originates;
   obtaining from a first database the attribute which is associated with the telephone number, the attribute not including the telephone number;
   based on the telephone number, searching a second database for data concerning a party to which the telephone number is assigned;
   comparing the data with the attribute;
   determining fraudulent use of the class of service when the data does not correspond to the attribute; and
   providing service to the caller at a rate different from the rate accorded to the class of service, when fraudulent use of the service is determined.

13. The method according to claim 12, wherein the selected class of service is accorded a discount on a rate of the telecommunication service.

14. The method according to claim 12, wherein the attribute includes the name of the party registered with the service, and the data includes the name of the party to which the telephone number is assigned.

15. The method according to claim 12, wherein the attribute includes a type of the party registered with the service, and the second data includes a type of the party to which the telephone number is assigned.

16. The method according to claim 15, wherein the type of the party registered with the service includes a business user.

17. The method according to claim 15, wherein the type of the party registered with the service includes a residential user.

18. The method according to claim 15, wherein the type of the party registered with the service includes a wireless communications user.

19. The method according to claim 15, wherein the type of the party registered with the service includes a governmental user.

20. The method according to claim 12, wherein the information assistance request comprises a request for connecting the caller to a desired destination party.

21. The method according to claim 12, wherein the information assistance request is received after the caller generates a signal to invoke information assistance.

22. The method according to claim 21, wherein the signal is generated by the caller's pressing one or more predetermined keys on a telephonic device.

23. The method according to claim 12, wherein the telephone number is used to identify a profile containing preferences for handling the call.

24. A system for use by a provider of a telecommunication service, including information assistance, to detect fraudulent use of the telecommunication service, the system comprising:

an interface for receiving from a caller a call, which includes at least one information assistance request;

a device for deriving, from signals associated with the call, a telephone number from which the call originates, first data concerning a party registered with the service being obtained from a search of a first database based on the telephone number;

a server for searching, based on the telephone number, a second database for second data concerning a party to which the telephone number is assigned, the first data being compared with the second data; and at least one processor for determining fraudulent use of the service if the first data does not correspond to the second data, and for providing service to the caller at a rate different from the rate given to the party registered with the service, when the fraudulent use of the service is determined.

25. The system according to claim 24, wherein the first data includes the name of the party registered with the service, and the second data includes the name of the party to which the telephone number is assigned.

26. The system according to claim 24, wherein the first data includes a type of the party registered with the service, and the second data includes a type of the party to which the telephone number is assigned.

27. The system according to claim 26, wherein the type of the party registered with the service includes a business user.

28. The system according to claim 26, wherein the type of the party registered with the service includes a residential user.

29. The system according to claim 26, wherein the type of the party registered with the service includes a wireless communications user.

30. The system according to claim 26, wherein the type of the party registered with the service includes a governmental user.

31. The system according to claim 24, wherein the information assistance request comprises a request for connecting the caller to a desired destination party.

32. The system according to claim 24, wherein the information assistance request is received after the caller generates a signal to invoke information assistance.

33. The system according to claim 32, wherein the signal is generated by the caller's pressing one or more predetermined keys on a telephonic device.

34. The system according to claim 24, wherein the telephone number is used to identify a profile containing preferences for handling the call.

35. A system for use by a provider of a telecommunication service, including information assistance, a party registered with the service being afforded a class of service based on at least one attribute of the party, the system comprising:

an interface for receiving from a caller a call, which includes at least one information assistance request;

a device for deriving, from signals associated with the call, a telephone number from which the call originates, the attribute which is associated with the telephone number being obtained from a first database and which does not include the telephone number;

a server for searching, based on the telephone number, a second database for data concerning a party to which the telephone number is assigned, the data being compared with the attribute; and at least one processor for determining fraudulent use of the class of service when the data does not correspond to the attribute, and for providing the caller with a rate different from the rate accorded to the class of service, when the fraudulent use of the service is determined.

36. The system according to claim 35, wherein the selected class of service is accorded a discount on a rate of the telecommunication service.

37. The system according to claim 35, wherein the attribute includes the name of the party registered with the service, and the data includes the name of the party to which the telephone number is assigned.

38. The system according to claim 35, wherein the attribute includes a type of the party registered with the service, and the second data includes a type of the party to which the telephone number is assigned.

39. The system according to claim 38, wherein the type of the party registered with the service includes a business user.

40. The system according to claim 38, wherein the type of the party registered with the service includes a residential user.

41. The system according to claim 38, wherein the type of the party registered with the service includes a wireless communications user.

42. The system according to claim 38, wherein the type of the party registered with the service includes a governmental user.

43. The system according to claim 35, wherein the information assistance request comprises a request for connecting the caller to a desired destination party.

44. The system according to claim 35, wherein the information assistance request is received after the caller generates a signal to invoke information assistance.

45. The system according to claim 44, wherein the signal is generated by the caller's pressing one or more predetermined keys on a telephonic device.

46. The system according to claim 35, wherein the telephone number is used to identify a profile containing preferences for handling the call.

* * * * *